(12) United States Patent
Mitev

(10) Patent No.: US 11,518,485 B2
(45) Date of Patent: Dec. 6, 2022

(54) AUTONOMOUS LIFEBUOY

(71) Applicant: Gancho Mitev Mitev, Burgas (BG)

(72) Inventor: Gancho Mitev Mitev, Burgas (BG)

(73) Assignee: Marine PV Technologies Ltd., London (GB)

( * ) Notice: Subject to any disclaimer, the term of this patent is extended or adjusted under 35 U.S.C. 154(b) by 412 days.

(21) Appl. No.: 16/742,908

(22) Filed: Jan. 14, 2020

(65) Prior Publication Data

US 2020/0148320 A1   May 14, 2020

Related U.S. Application Data

(63) Continuation-in-part of application No. PCT/BG2018/000031, filed on Jul. 9, 2018.

(30) Foreign Application Priority Data

Jul. 14, 2017  (BG) ...................................... 112542

(51) Int. Cl.
| | |
|---|---|
| *B63C 9/08* | (2006.01) |
| *B63H 1/14* | (2006.01) |
| *B63H 19/00* | (2006.01) |
| *G05D 1/02* | (2020.01) |
| *H04M 1/72412* | (2021.01) |
| *H04M 1/72421* | (2021.01) |

(52) U.S. Cl.
CPC ................. *B63C 9/08* (2013.01); *B63H 1/14* (2013.01); *B63H 19/00* (2013.01); *G05D 1/0206* (2013.01); *H04M 1/72412* (2021.01); *H04M 1/72421* (2021.01)

(58) Field of Classification Search
CPC .. B63C 9/08; B63C 9/082; B63H 1/14; B63H 19/00; H04M 1/72412; H04M 1/72421; G05D 1/0206
USPC ................................ 441/80, 81, 131; 701/21
See application file for complete search history.

(56) References Cited

U.S. PATENT DOCUMENTS

| | | | |
|---|---|---|---|
| 4,276,851 A | 7/1981 | Coleman | |
| 4,593,273 A | 6/1986 | Narcisse | |
| 5,597,335 A * | 1/1997 | Woodland | ............... B63B 7/082 |
| | | | 114/348 |

(Continued)

FOREIGN PATENT DOCUMENTS

| | | |
|---|---|---|
| CN | 201124925 Y | 10/2008 |
| CN | 202783739 U | 3/2013 |

(Continued)

*Primary Examiner* — Daniel V Venne
(74) *Attorney, Agent, or Firm* — Inventech Patent Services, LLC; Marc A. Scharich

(57) ABSTRACT

An autonomous lifebuoy includes a body, an electric power supply, a propelling module and a control unit configured to control the autonomous lifebuoy so as to automatically guide the autonomous lifebuoy towards a person overboard in water, during a man overboard (MOB) situation. The control unit includes at least one communication module, a non-volatile memory, a graphics processing unit (GPU) configured to perform an image comparison and a microcomputer configured to make calculations, based on at least the image comparison performed by the graphics processing unit (GPU), and issue commands to at least the propelling module to propel the autonomous lifebuoy towards the person overboard in the water during the man overboard (MOB) situation.

20 Claims, 2 Drawing Sheets

(56) References Cited

U.S. PATENT DOCUMENTS

| | | | |
|---|---|---|---|
| 5,838,227 A | 11/1998 | Murray | |
| 6,558,218 B1 * | 5/2003 | Hansen | B63C 9/01 441/80 |
| 8,882,555 B2 * | 11/2014 | Mulligan | B63C 9/00 441/80 |
| 9,927,529 B2 * | 3/2018 | Morin | G01S 1/725 |
| 10,322,782 B1 * | 6/2019 | Brown | B63G 8/20 |

FOREIGN PATENT DOCUMENTS

| | | |
|---|---|---|
| CN | 202828044 U | 3/2013 |
| CN | 203064186 U | 7/2013 |
| CN | 103407560 A | 11/2013 |
| CN | 204415690 U | 6/2015 |
| CN | 205440813 U | 8/2016 |
| CN | 103661851 B | 1/2017 |
| CN | 107364554 A | 11/2017 |
| CN | 105253274 B | 12/2017 |
| CN | 207374617 U | 5/2018 |
| CN | 109110086 A | 1/2019 |
| CN | 109591977 A | 4/2019 |
| CN | 107364558 B | 6/2019 |

\* cited by examiner

AUTONOMOUS LIFEBUOY

CROSS-REFERENCE TO RELATED APPLICATIONS

This application is a continuation-in-part of PCT International Application No. PCT/BG2018/000031, filed on Jul. 9, 2018, which claims the benefit of priority from Bulgarian Patent Application No. 112542, filed on Jul. 14, 2017, each of which is hereby incorporated by reference in its entirety for all purposes.

TECHNICAL FIELD

The present disclosure relates generally to personal flotation devices and life preservers and, more particularly, to an autonomous lifebuoy.

BACKGROUND

Personal flotation devices and life preservers, such as lifebuoys and the like, have been employed during emergency situations on various watercraft (e.g., various boats, yachts, ships, etc.) for many years. For example, during a man overboard (MOB) situation in which a person has inadvertently fallen out of a watercraft and into the surrounding water (i.e., overboard), a lifebuoy may be launched from the watercraft into the water towards the person overboard while attempting rescue, especially if the person overboard is still conscious (e.g., with at least their head above the surface of the water). Once launched into the water towards the person overboard, the lifebuoy is hopefully within reach of the person overboard. If for whatever reason the lifebuoy is not within reach of the person overboard, it is often more difficult to rescue the person overboard.

In some MOB situations, while attempting rescue, at least one other person (e.g., one or more members of a marine crew or rescue team) may descend into the water with the lifebuoy and attempt to swim towards the person overboard to guide the lifebuoy to the person overboard. While this approach for guiding the lifebuoy to the person overboard may be deemed necessary while attempting rescue, especially if the person overboard is unconscious, the at least one other person attempting rescue may also be susceptible to substantial risk and danger while in the water, thus potentially further exacerbating the MOB situation.

In an attempt to improve at least the guiding of a lifebuoy towards a person overboard, such as during a MOB situation, some lifebuoys with added features and function have been developed. For example, motorized lifebuoys which are controlled by a remote control are disclosed in CN201124925Y; CN202828044U; CN203064186U and U.S. Pat. No. 8,882,555B2. Unfortunately, such motorized lifebuoys which are controlled by a remote control are often disadvantageous and impractical for use, especially during a MOB situation. For example, the remote control typically needs to be readily available, located nearby and within a certain distance from the motorized lifebuoy employed during the MOB situation. Additionally, the remote control typically requires the use of batteries which are sufficiently charged and often needs regular maintenance. Furthermore, the remote control is often not easy to operate, and as such, staff such as one or more members of a marine crew or rescue team often need special training or instruction in order to properly operate the remote control.

As another example, an automatic lifebuoy for automatically reaching a person overboard, such as in a MOB situation, is disclosed in CN205440813U. The automatic lifebuoy includes at least an infrared positioning device, a control module and a power module, which are located in a body of the automatic lifebuoy. The infrared positioning device operates to detect a location of a human body in the water (e.g., a person overboard during a MOB situation) and transmits information to the control module that controls electric motors of the automatic lifebuoy. With operation of the electric motors, the automatic lifebuoy is driven with the intent of reaching the person overboard during the MOB situation. However, in this regard, the automatic lifebuoy relies on at least an infrared sensor that is mounted on the automatic lifebuoy. During employment of the automatic lifebuoy, the infrared sensor is elevated less than 10 cm above the surface of the water. The infrared sensor needs to have direct vision in order to detect heat of a person's head (e.g., the heat of the head of the person overboard during the MOB situation), but that is often not possible as there are typically water waves present between the automatic lifebuoy and the infrared sensor. As such, the automatic lifebuoy may not function properly or as intended in various MOB situations as a result of relying on at least such an infrared sensor as described.

With at least the aforementioned challenges, limitations and disadvantages associated with the use of such aforementioned lifebuoys in mind, there is a continuing unaddressed need for a lifebuoy (i) which is at least capable of sufficiently guiding itself, when launched into water, towards a person overboard during a MOB situation, (ii) which is at least capable of being controlled without a person controlling it (e.g., being controlled without communicating with a remote control that is operated by a person), (iii) which is at least capable of reducing or eliminating the need for one or more members of a marine crew or rescue team to descend into the water and attempt to swim towards the person overboard to guide the lifebuoy to the person overboard, especially if the person overboard is still conscious (e.g., with at least their head above the surface of the water), (iv) which is at least capable of providing an efficient and reliable water rescue of the person overboard during the MOB situation, (v) which is at least user-friendly and (vi) which is at least relatively low-maintenance.

SUMMARY

At least the above-identified need is addressed with the present disclosure. One aspect of the present disclosure is directed to an autonomous lifebuoy. The autonomous lifebuoy includes a body, an electric power supply, a propelling module and a control unit. The control unit is configured to control the autonomous lifebuoy so as to automatically guide the autonomous lifebuoy towards a person overboard in water, during a man overboard (MOB) situation, once the autonomous lifebuoy is launched into the water. The control unit includes at least one communication module configured to connect to at least one of a local area network (LAN) in proximity of the autonomous lifebuoy, a camera in proximity of the autonomous lifebuoy and a smartphone camera in proximity of the autonomous lifebuoy, once the autonomous lifebuoy is launched into the water during the man overboard (MOB) situation. Additionally, the control unit further includes a non-volatile memory in which images of the autonomous lifebuoy itself and a person overboard are pre-recorded. Additionally, the control unit further includes a graphics processing unit (GPU) configured to perform an image comparison by comparing the pre-recorded images of the autonomous lifebuoy itself and the person overboard with images received, by way of the at least one communication module, from at least one of the local area network (LAN) in proximity of the autonomous lifebuoy, the camera in proximity of the autonomous lifebuoy and the smartphone camera in proximity of the autonomous lifebuoy. Additionally, the control unit further includes a microcomputer configured to make calculations, based on at least the image comparison performed by the graphics processing unit (GPU), and issue commands to at least the propelling module to propel the autonomous lifebuoy towards the person overboard in the water during the man overboard (MOB) situation.

Another aspect of the present disclosure is directed to an autonomous lifebuoy. The autonomous lifebuoy includes a body, an electric power supply, a propelling module and a control unit. The control unit is configured to control the autonomous lifebuoy so as to automatically guide the autonomous lifebuoy towards a person overboard in water, during a man overboard (MOB) situation, once the autonomous lifebuoy is launched into the water. The control unit includes a Voice Activity Detector (VAD) configured to detect sound in proximity of the autonomous lifebuoy once the autonomous lifebuoy is launched into the water during the man overboard (MOB) situation. Additionally, the control unit further includes an algorithm configured to analyze the sound detected by the Voice Activity Detector (VAD) and further match the sound detected by the Voice Activity Detector (VAD) to pre-recorded signatures of cries for help from a person in one or more languages.

Yet another aspect of the present disclosure is directed to an autonomous lifebuoy. The autonomous lifebuoy includes a body, an electric power supply, a propelling module and a control unit. The control unit is configured to control the autonomous lifebuoy so as to automatically guide the autonomous lifebuoy towards a person overboard in water, during a man overboard (MOB) situation, once the autonomous lifebuoy is launched into the water. The control unit includes a sonar module.

BRIEF DESCRIPTION OF THE DRAWINGS

One or more exemplary embodiments of the present disclosure are pointed out with particularity in the appended claims. However, other features of the one or more embodiments will become more apparent and will be best understood by referring to the following detailed description in conjunction with the accompanying drawings, wherein:

DETAILED DESCRIPTION

As required, one or more detailed embodiments of the present disclosure are disclosed herein, however, it is to be understood that the disclosed embodiments are merely exemplary of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure. Furthermore, the use of a singular term, such as, "a" is not to be interpreted as limiting the number of components or details of particular components. Additionally, various terms and/or phrases describing or indicating a position or directional reference such as, but not limited to, "top", "bottom", "front", "rear", "forward", "rearward", "end", "outer", "inner", "left", "right", "vertical", "horizontal", "upper", "lower", etc. may relate to one or more particular components as seen generally from a user's vantage point during use or operation, and such terms and/or phrases are not to be interpreted as limiting, but merely as a representative basis for describing the present disclosure to one skilled in the art.

Referring generally to the figures, an exemplary autonomous lifebuoy LB is collectively shown and further described herein.

Figure 1:
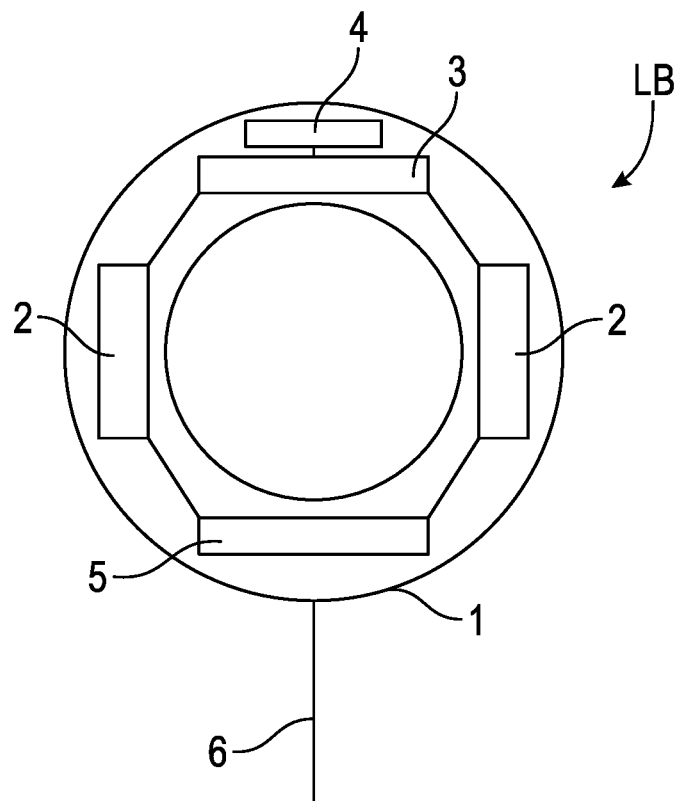
FIG. 1 is a schematic diagram of an autonomous lifebuoy according to the present disclosure.
Figure 2:
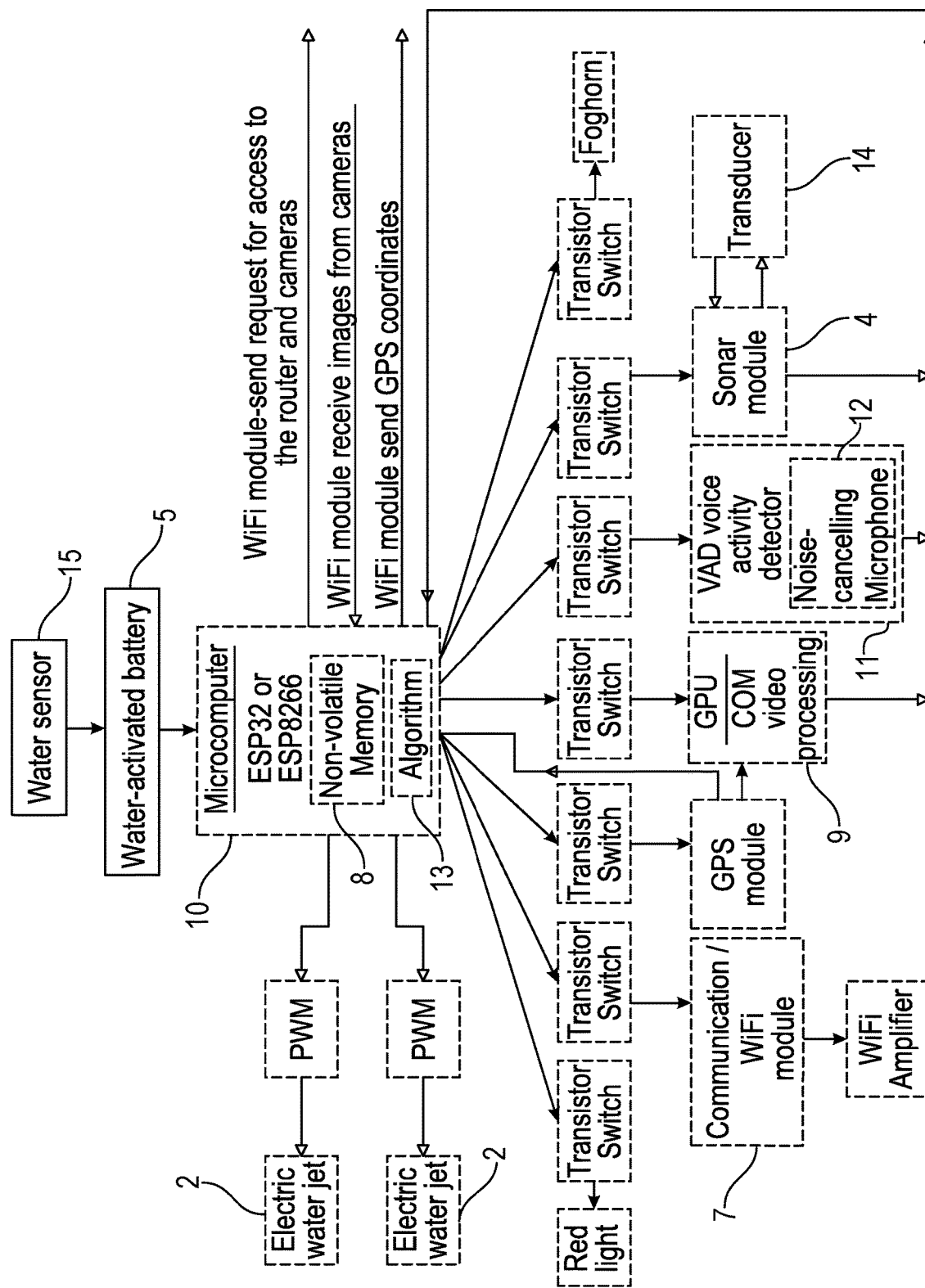
FIG. 2 is a block diagram schematically illustrating various components of the autonomous lifebuoy which are in communication with each other.

Referring to FIG. 1 and FIG. 2, the autonomous lifebuoy LB includes a body 1 which is buoyant, and may therefore be made from one or more materials, or combination of materials, such as cork, technical plastics, carbon composites, various foams, etc. As shown in FIG. 1, the body 1 of the autonomous lifebuoy LB may be ring-shaped.

The autonomous lifebuoy LB further includes a propelling module which may include water propellers 2 (e.g., electric water jets 2 (FIG. 2), thrusters, etc.) to propel at least the body 1 of the autonomous lifebuoy LB when in water. More specifically, there may be two water propellers 2 mounted on respective left and right sides of the body 1 of the autonomous lifebuoy LB. The water propellers 2 may be located in L-shaped water channels through which the water propellers 2 suck water from beneath the autonomous lifebuoy LB and dispose of it through ends of the water channels.

The autonomous lifebuoy LB further includes a control unit 3. The control unit 3 is configured to control the autonomous lifebuoy LB so as to automatically guide the autonomous lifebuoy LB towards a person overboard in water, during a man overboard (MOB) situation, once the autonomous lifebuoy LB is launched into the water. In this regard, the control unit 3 is further configured to control the autonomous lifebuoy LB without communicating with a remote control that is capable of being operated by a person. The control unit 3 includes at least one communication module 7 (e.g., WiFi module 7 (FIG. 2)) configured to connect to at least one of a local area network (LAN) in proximity of the autonomous lifebuoy LB, a camera in proximity of the autonomous lifebuoy LB and a smartphone camera in proximity of the autonomous lifebuoy LB, once the autonomous lifebuoy LB is launched into the water during the man overboard (MOB) situation. The at least one communication module 7 may include at least one of a low-power wide-area network (LPWAN) module, a LoRaWAN module, a NB-IoT module, a Sigfox module, an IoT Network Solution module, a Bluetooth module, a WiFi module, a ZigBee module, an ANT module and a GSM module.

Additionally, the control unit 3 further includes a non-volatile memory 8 (FIG. 2) in which images of the autonomous lifebuoy LB itself and a person overboard are pre-recorded. The non-volatile memory 8 may include at least one of module ROM, Mask ROM, PROM, EPROM, EEPROM, Flash memory, NVRAM, ReRAM, FeRAM, MRAM, PCM (3D XPoint), FeFET memory, Magnetic, hard disk drive, Optical disc, CBRAM, Racetrack memory, NRAM, Millipede memory and FJG RAM.

The autonomous lifebuoy LB may further include a link member configured to connect the at least one communication module 7 with the non-volatile memory 8. The link member may be SCSI, IDE, or SATA, or PC2, or universal serial bus (USB).

Additionally, the control unit 3 further includes a microprocessor such as a graphics processing unit (GPU) 9 (e.g., COM video processing 9 (FIG. 2)) configured to perform an image comparison by comparing the pre-recorded images of the autonomous lifebuoy LB itself and the person overboard with images received, by way of the at least one communication module 7, from at least one of the local area network (LAN) in proximity of the autonomous lifebuoy LB, the camera in proximity of the autonomous lifebuoy LB and the smartphone camera in proximity of the autonomous lifebuoy LB.

Additionally, the control unit 3 further includes a microcomputer 10 (as shown in FIG. 2) configured to make calculations, based on at least the image comparison performed by the graphics processing unit (GPU) 9, and issue commands to at least the propelling module to propel (e.g., by way of propelling the water propellers 2) the autonomous lifebuoy LB towards the person overboard in the water during the man overboard (MOB) situation. The microcomputer 10 includes at least one of a single-chip computer, a computer-on-module (COM), a chip on-board (COB) and a single-board computer (SBC).

The autonomous lifebuoy LB may further include a link member configured to connect the non-volatile memory 8 with the microcomputer 10. The link member may be SCSI, IDE, or SATA, or PC2, or universal serial bus (USB).

The control unit 3 further includes a Voice Activity Detector (VAD) 11 (FIG. 2), which may include at least one noise-cancelling microphone 12. The Voice Activity Detector (VAD) 11 is configured to detect sound in proximity of the autonomous lifebuoy LB, once the autonomous lifebuoy LB is launched into the water during the man overboard (MOB) situation. The control unit 3 further includes an algorithm 13 configured to analyze the sound detected by the Voice Activity Detector (VAD) 11 and further match the sound detected by the Voice Activity Detector (VAD) 11 to pre-recorded signatures of cries for help from a person in one or more languages. When the Voice Activity Detector (VAD) 11 detects sound in proximity of the autonomous lifebuoy LB once the autonomous lifebuoy LB is launched into the water during the man overboard (MOB) situation, and the algorithm 13 analyzes and matches the sound detected by the Voice Activity Detector (VAD) 11 to be a cry for help from a person, the control unit 3 controls at least the propelling module to propel the autonomous lifebuoy LB towards the person overboard in the water during the man overboard (MOB) situation.

The control unit 3 further includes a sonar module 4 (FIGS. 1 and 2) including a transducer 14 (FIG. 2) configured to send out sound waves into the water, once the autonomous lifebuoy LB is launched into the water during the man overboard (MOB) situation, such that when the sound waves hit an object in the water, the transducer 14 estimates a size of the object and a distance to the object and sends this information to the sonar module 4. When the sonar module 4 receives the information from the transducer 14 relating to the estimated size of the object in the water and the estimated distance to the object, and the control unit 3 determines that the object in the water is representative of a person in the water, the control unit 3 controls at least the propelling module to propel the autonomous lifebuoy LB towards the person overboard in the water during the man overboard (MOB) situation.

The autonomous lifebuoy LB further includes a power unit/electric power supply 5 (FIGS. 1 and 2), which may comprise a water-activated battery 5. The water-activated battery 5 starts operating when water sensor 15 (FIG. 2) comes in contact with water. The water-activated battery 5 feeds the water propellers 2 and the control unit 3 with the at least one communication module 7 mounted on it for connection to the local area network (LAN) and smartphones, the non-volatile memory 8 in which the images of the autonomous lifebuoy LB itself and the person overboard are pre-recorded, the graphics processing unit (GPU) 9 for comparing the pre-recorded images with the images received from a live feed (i.e., by way of the at least one communication module 7), and the microcomputer 10 for calculating and issuing commands to the water propellers 2. Additionally, the autonomous lifebuoy LB may further include a connection line 6 (FIG. 1), such as a rope or other flexible line, to connect to a watercraft/vessel.

There are two main situations in water saving: the victim (i.e., the person overboard in the water) is conscious and above the surface (type 1) and the victim is unconscious (type 2). The second situation (type 2) always requires another person, or a rescue team, who are trained in water rescue to enter the water and extract the person overboard in the water. In this regard, one purpose of the autonomous lifebuoy LB is to provide a quick and credible rescuer to the crew in the first situation (type 1) when the person overboard in the water is conscious and above the surface. Another purpose of the autonomous lifebuoy LB is to eliminate the need of the rescue team to descend into the water and swim with a lifebuoy to the person overboard in the water. The autonomous lifebuoy LB does not need an operator to control it and therefore there is no remote controller. In order to identify the person overboard's location, the autonomous lifebuoy LB receives the live feed in the form of images from the closest camera or the nearest smartphone through the Internet or intranet. It then analyzes those images and determines the person overboard's location. This is possible because modern boats and yachts provide an Internet connection for crew members and guests via a WiFi hotspot. The autonomous lifebuoy LB will connect to the Internet via "Industry standard Maritime VSAT systems" or (in coastal areas) via 4G routers. Normally, the autonomous lifebuoy LB is located in a dry place on the ship and therefore the water-activated battery 5 is inactive. In the type 1 person overboard situation, the autonomous lifebuoy LB is thrown into the water. The water is sensed by water sensor 15 and the water-activated battery 5 becomes activated which powers the control unit 3. The control unit 3 calculates the location of the person overboard in the water during the man overboard (MOB) situation and sets course towards them without any need of external interference.

In order to calculate the location of the person overboard in the water, the autonomous lifebuoy LB analyzes the live feed it receives from nearby cameras. The control unit 3 receives the live feed (i.e., by way of the at least one communication module 7) over WiFi network that connects all devices on board—cameras and smartphones. When the control unit 3 is activated (i.e., when the autonomous lifebuoy LB is thrown into the water) it sends out a request to access the cameras and video recording equipment on all devices on the WiFi network. The autonomous lifebuoy LB has two supportive systems that help pinpoint the precise location of the person overboard in the water once the autonomous lifebuoy LB is within close range. The first supportive system is an acoustic system, looking for sounds similar to the word "help" in a variety of languages (i.e., by way of the Voice Activity Detector (VAD) 11). The acoustic system also has noise reduction technology in order to operate efficiently in a noisy environment. It uses memorized profiles of different types of noise and includes seven noise-cancelling microphones 12 located over the autonomous lifebuoy's LB periphery. "Voice Activity Detection" software works along with the "Noise reduction technology" in order to improve the signal/noise ratio (SNR) and recognize human voice. The second supportive system is sonar navigation, which searches for the sonar profile of the underwater motion of the person overboard in the water who kicks and makes sharp movements in panic.

After throwing the autonomous lifebuoy LB into the water, the control unit 3 sends a request to all devices in the local area network (LAN) to turn on their cameras and start sharing the live feed. This ensures that the control unit 3 receives images from a high point of view. After calculating the location of the person overboard in the water, the control unit 3 sends a signal to the water propellers 2 to set course towards them. Then, if the autonomous lifebuoy LB does not reach the person overboard in the water, the autonomous lifebuoy LB continues in the same direction and searches with the Voice Activity Detector (VAD) 11, which establishes the presence or absence of human speech in environmental sounds and with an Active Positioning Sonar (sonar navigation) that is pointing in the direction of human motion (direction opposite to the water propellers 2), which includes: sound wave emitter; Multiposition hydro-acoustic system with correlation processing of received signals. This solution has the following advantages: everyone, at any time, carries the phone. 100 meters is the distance a WiFi signal can cover, but it is sufficient for the autonomous lifebuoy LB. In addition, real-time video (live feed) will be obtained that will be needed for further rescue or investigative actions.

While one or more exemplary embodiments are described above, it is not intended that these embodiments describe all possible forms of the present disclosure. Rather, the words used in the specification are words of description rather than limitation, and it is understood that various changes may be made without departing from the spirit and scope of the present disclosure.

With regard to any processes, systems, methods, heuristics, etc., described herein, it should be understood that, although the steps of such processes, etc., have been described as occurring according to a certain ordered sequence, such processes could be practiced with the described steps performed in an order other than the order described herein. It should be further understood that certain steps could be performed simultaneously, that other steps could be added, or that certain steps described herein could be omitted. In other words, the descriptions of processes described above are provided for the purpose of illustrating certain embodiments, and should in no way be construed so as to limit the claims.

As used in this specification and claims, the terms "for example"/("e.g."), "for instance", "such as", and "like", and the verbs "comprising", "having", "including", and their other verb forms, when used in conjunction with a listing of one or more carriers or other items, are each to be construed as open-ended, meaning that the listing is not to be considered as excluding other, additional carriers or items. Other terms are to be construed using their broadest reasonable meaning unless they are used in a context that requires a different interpretation.

What is claimed is:

1. An autonomous lifebuoy, comprising:
   a body;
   an electric power supply;
   a propelling module; and
   a control unit configured to control the autonomous lifebuoy so as to automatically guide the autonomous lifebuoy towards a person overboard in water, during a man overboard (MOB) situation, once the autonomous lifebuoy is launched into the water, wherein the control unit includes:
   at least one communication module configured to connect to at least one of a local area network (LAN) in proximity of the autonomous lifebuoy, a camera in proximity of the autonomous lifebuoy and a smartphone camera in proximity of the autonomous lifebuoy, once the autonomous lifebuoy is launched into the water during the man overboard (MOB) situation,
   a non-volatile memory in which images of the autonomous lifebuoy itself and a person overboard are pre-recorded,
   a graphics processing unit (GPU) configured to perform an image comparison by comparing the pre-recorded images of the autonomous lifebuoy itself and the person overboard with images received, by way of the at least one communication module, from at least one of the local area network (LAN) in proximity of the autonomous lifebuoy, the camera in proximity of the autonomous lifebuoy and the smartphone camera in proximity of the autonomous lifebuoy, and
   a microcomputer configured to make calculations, based on at least the image comparison performed by the graphics processing unit (GPU), and issue commands to at least the propelling module to propel the autonomous lifebuoy towards the person overboard in the water during the man overboard (MOB) situation.

2. The autonomous lifebuoy according to claim 1, wherein the at least one communication module includes at least one of a low-power wide-area network (LPWAN) module, a LoRaWAN module, a NB-IoT module, a Sigfox module, an IoT Network Solution module, a Bluetooth module, a WiFi module, a ZigBee module, an ANT module and a GSM module.

3. The autonomous lifebuoy according to claim 1, wherein the non-volatile memory includes at least one of module ROM, Mask ROM, PROM, EPROM, EEPROM, Flash memory, NVRAM, ReRAM, FeRAM, MRAM, PCM (3D XPoint), FeFET memory, Magnetic, hard disk drive, Optical disc, CBRAM, Racetrack memory, NRAM, Millipede memory and FJG RAM.

4. The autonomous lifebuoy according to claim 1, wherein the microcomputer includes at least one of a single-chip computer, a computer-on-module (COM), a chip on-board (COB) and a single-board computer (SBC).

5. The autonomous lifebuoy according to claim 1, wherein the control unit further includes:
   a Voice Activity Detector (VAD) configured to detect sound in proximity of the autonomous lifebuoy once the autonomous lifebuoy is launched into the water during the man overboard (MOB) situation,
   an algorithm configured to analyze the sound detected by the Voice Activity Detector (VAD) and further match the sound detected by the Voice Activity Detector (VAD) to pre-recorded signatures of cries for help from a person in one or more languages, and a sonar module including a transducer configured to send out sound waves into the water, once the autonomous lifebuoy is launched into the water during the man overboard (MOB) situation, such that when the sound waves hit an object in the water, the transducer estimates a size of the object and a distance to the object and sends this information to the sonar module.

6. The autonomous lifebuoy according to claim 1, wherein the control unit is further configured to control the autonomous lifebuoy without communicating with a remote control that is capable of being operated by a person.

7. The autonomous lifebuoy according to claim 1, wherein the electric power supply comprises a water-activated battery.

8. The autonomous lifebuoy according to claim 1, wherein the propelling module includes at least one water propeller.

9. An autonomous lifebuoy, comprising:
a body;
an electric power supply;
a propelling module; and
a control unit configured to control the autonomous lifebuoy so as to automatically guide the autonomous lifebuoy towards a person overboard in water, during a man overboard (MOB) situation, once the autonomous lifebuoy is launched into the water, wherein the control unit includes:
a Voice Activity Detector (VAD) configured to detect sound in proximity of the autonomous lifebuoy once the autonomous lifebuoy is launched into the water during the man overboard (MOB) situation, and
an algorithm configured to analyze the sound detected by the Voice Activity Detector (VAD) and further match the sound detected by the Voice Activity Detector (VAD) to pre-recorded signatures of cries for help from a person in one or more languages.

10. The autonomous lifebuoy according to claim 9, wherein when the Voice Activity Detector (VAD) detects sound in proximity of the autonomous lifebuoy once the autonomous lifebuoy is launched into the water during the man overboard (MOB) situation and the algorithm analyzes and matches the sound detected by the Voice Activity Detector (VAD) to be a cry for help from a person, the control unit controls at least the propelling module to propel the autonomous lifebuoy towards the person overboard in the water during the man overboard (MOB) situation.

11. The autonomous lifebuoy according to claim 9, wherein the Voice Activity Detector (VAD) includes at least one noise-cancelling microphone.

12. The autonomous lifebuoy according to claim 9, wherein the control unit is further configured to control the autonomous lifebuoy without communicating with a remote control that is capable of being operated by a person.

13. The autonomous lifebuoy according to claim 9, wherein the electric power supply comprises a water-activated battery.

14. The autonomous lifebuoy according to claim 9, wherein the propelling module includes at least one water propeller.

15. An autonomous lifebuoy, comprising:
a body;
an electric power supply;
a propelling module; and
a control unit configured to control the autonomous lifebuoy so as to automatically guide the autonomous lifebuoy towards a person overboard in water, during a man overboard (MOB) situation, once the autonomous lifebuoy is launched into the water, wherein the control unit includes a sonar module including a transducer configured to send out sound waves into the water, once the autonomous lifebuoy is launched into the water during the man overboard (MOB) situation, such that when the sound waves hit an object in the water, the transducer estimates a size of the object and a distance to the object and sends this information to the sonar module.

16. The autonomous lifebuoy according to claim 15, wherein when the sonar module receives the information from the transducer relating to the estimated size of the object in the water and the estimated distance to the object, and the control unit determines that the object in the water is representative of a person in the water, the control unit controls at least the propelling module to propel the autonomous lifebuoy towards the person overboard in the water during the man overboard (MOB) situation.

17. The autonomous lifebuoy according to claim 15, wherein the control unit is further configured to control the autonomous lifebuoy without communicating with a remote control that is capable of being operated by a person.

18. The autonomous lifebuoy according to claim 15, wherein the electric power supply comprises a water-activated battery.

19. The autonomous lifebuoy according to claim 15, wherein the propelling module includes at least one water propeller.

20. The autonomous lifebuoy according to claim 15, wherein the body of the autonomous lifebuoy is ring-shaped.

* * * * *